US012281588B1

(12) United States Patent
Austin et al.

(10) Patent No.: US 12,281,588 B1
(45) Date of Patent: Apr. 22, 2025

(54) SPLIT CASE HAVING CASTABLE POCKET

(71) Applicant: RTX Corporation, Farmington, CT (US)

(72) Inventors: Michael Davis Austin, Meriden, CT (US); Mason Adam Kessler, Rocky Hill, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/540,507

(22) Filed: Dec. 14, 2023

(51) Int. Cl.
*F01D 25/24* (2006.01)

(52) U.S. Cl.
CPC .......... *F01D 25/24* (2013.01); *F05D 2230/21* (2013.01)

(58) Field of Classification Search
CPC ...... F01D 11/08; F01D 25/246; F01D 11/005; F01D 25/005; F01D 25/243; F01D 25/28; F01D 9/04; F01D 17/162; F01D 25/24; F01D 5/147; F01D 5/284; F01D 9/041; F01D 25/12
See application file for complete search history.

(56) References Cited

U.S. PATENT DOCUMENTS 7,338,253 B2 * 3/2008 Nigmatulin ............... F02C 7/28 415/139
9,212,666 B2 12/2015 Abadie
10,082,039 B2 * 9/2018 Hanson .................. F16J 15/445
10,590,803 B2 * 3/2020 Quennehen ........... F01D 11/122
10,934,872 B2 * 3/2021 Tableau .................. F01D 25/28
11,220,924 B2 * 1/2022 Fernandez .............. F01D 11/08
11,725,525 B2 8/2023 Heeter
2003/0133790 A1 * 7/2003 Darkins, Jr. ............ F01D 11/24 415/139
2005/0152777 A1 * 7/2005 Thompson ............. F01D 11/08 415/173.3
2013/0051979 A1 * 2/2013 Durocher .................. F01D 9/04 415/115
2016/0040878 A1 * 2/2016 Hayek ....................... F23R 3/60 29/889.22
2016/0186999 A1 * 6/2016 Freeman ................. F23R 3/007 29/889.22
2018/0363486 A1 * 12/2018 Smoke .................. F01D 25/246
2019/0040761 A1 * 2/2019 Carlin ................... F01D 25/007

* cited by examiner

*Primary Examiner* — Anthony Ayala Delgado
(74) *Attorney, Agent, or Firm* — CANTOR COLBURN LLP

(57) ABSTRACT

A compressor casing is provided. The compressor casing includes an outer wall, a rail extending inwardly from the outer wall and comprising scallop features encompassing pathways and an inner wall connected with an inboard end of the rail. The inner wall includes a first platform surface at a first side of the rail and including first fillets interfacing with first sides of the scallop features and a second platform surface outboard of the first platform surface at a second side of the rail opposite the first side and including second fillets interfacing with second sides of the scallop features.

19 Claims, 4 Drawing Sheets

SPLIT CASE HAVING CASTABLE POCKET

BACKGROUND

Exemplary embodiments of the present disclosure relate generally to gas turbine engines and, in one embodiment, to a gas turbine engine that includes a split case having a castable pocket.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or fan or to produce electricity in a generator.

In many gas turbine engines, the compressor and the turbine include casings that are often cast. However, since casings of gas turbine engines typically have complex geometries, executing the casting processes can be difficult.

Accordingly, a need exists for a casing of a gas turbine engine that can be easily cast.

BRIEF DESCRIPTION

According to an aspect of the disclosure, a compressor casing is provided. The compressor casing includes an outer wall, a rail extending inwardly from the outer wall and including scallop features encompassing pathways and an inner wall connected with an inboard end of the rail. The inner wall includes a first platform surface at a first side of the rail and including first fillets interfacing with first sides of the scallop features and a second platform surface outboard of the first platform surface at a second side of the rail opposite the first side and including second fillets interfacing with second sides of the scallop features.

In accordance with additional or alternative embodiments, the outer and inner walls and the rail are circumferential features.

In accordance with additional or alternative embodiments, bosses that protrude radially outwardly from an outer surface of the outer wall.

In accordance with additional or alternative embodiments, each scallop feature encompasses a single pathway.

In accordance with additional or alternative embodiments, the rail includes smooth and continuous transitions between neighboring scallop features.

In accordance with additional or alternative embodiments, the rail is configured with an absence of a sharp edge between neighboring scallop features.

In accordance with additional or alternative embodiments, the second fillets extend radially outwardly beyond an outward radial extent of the first fillets.

In accordance with additional or alternative embodiments, a circumferential plane of the second platform surface is outboard of a corresponding circumferential plane of the first platform surface.

In accordance with additional or alternative embodiments, the second platform surface is a radially outermost surface of the inner wall aft of the second fillets.

According to an aspect of the disclosure, a compressor casing is provided. The compressor casing includes an outer wall, a rail extending inwardly from the outer wall and including scallop features encompassing pathways with smooth and continuous transitions between neighboring scallop features and an inner wall connected with an inboard end of the rail and including platform surfaces with fillets interfacing with the scallop features.

In accordance with additional or alternative embodiments, the outer and inner walls and the rail are circumferential features.

In accordance with additional or alternative embodiments, bosses that protrude radially outwardly from an outer surface of the outer wall.

In accordance with additional or alternative embodiments, each scallop feature encompasses a single pathway.

In accordance with additional or alternative embodiments, the rail is configured with an absence of a sharp edge between the neighboring scallop features.

In accordance with additional or alternative embodiments, the inner wall includes a first platform surface at a first side of the rail and includes first fillets interfacing with first sides of the scallop features and a second platform surface at a second side of the rail opposite the first side and including second fillets interfacing with second sides of the scallop features.

In accordance with additional or alternative embodiments, the second fillets extend radially outwardly beyond an outward radial extent of the first fillets.

In accordance with additional or alternative embodiments, a circumferential plane of the second platform surface is outboard of a corresponding circumferential plane of the first platform surface.

In accordance with additional or alternative embodiments, the second platform surface is a radially outermost surface of the inner wall aft of the second fillets.

According to an aspect of the disclosure, a casting method is provided and includes forming a mold into a compressor casing shape. The compressor casing shape includes an outer wall, a rail extending inwardly from the outer wall and including scallop features encompassing pathways with smooth and continuous transitions between neighboring scallop features and an inner wall connected with an inboard end of the rail. The inner wall includes a first platform surface at a first side of the rail and including first fillets interfacing with first sides of the scallop features and a second platform surface outboard of the first platform surface at a second side of the rail opposite the first side and including second fillets interfacing with second sides of the scallop features. The method further includes coating an entirety of the mold with slurry, curing the slurry to form a cavity and injecting molten metallic material into the cavity.

In accordance with additional or alternative embodiments, the mold is a lost wax mold.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
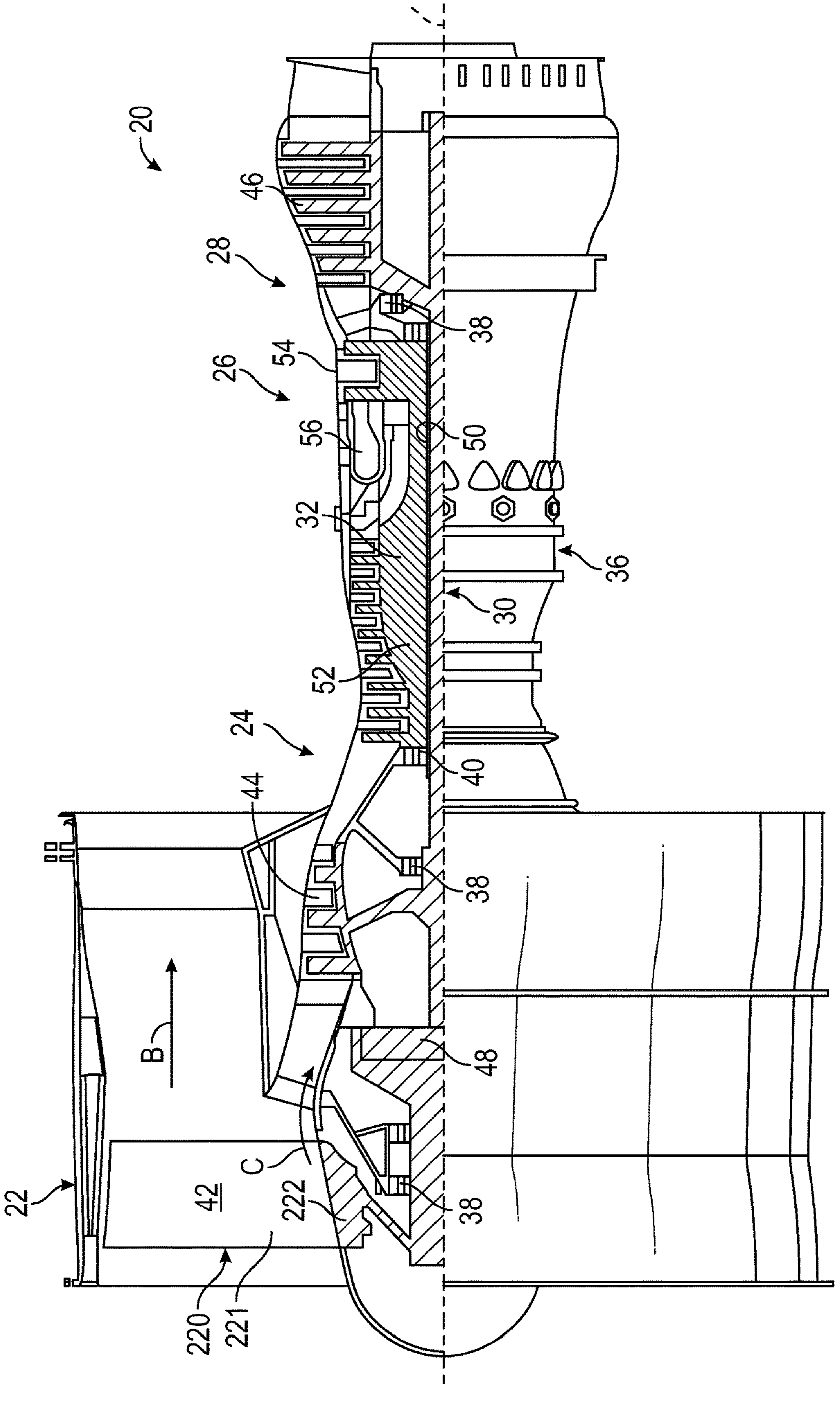
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

With continued reference to FIG. 1, the compressor section 24 includes a casing or, more particularly, a split casing that is formed by casting. Currently, however, compressor split case castings can have geometries that can be difficult to cast while remaining within required tolerances and while achieving required quality. With a lost wax casting method, for instance, shell creation processes can be made more difficult by tight bends or areas that tend to trap shell slurry. This can lead to locally thickened areas in shell layers that do not cure to required quality. In these or other cases, when metal is later poured into a mold in liquid form, the liquid metal has to flow around the same tight bends. If the material of the shell layers in those tight bends is not as strong as it needs to be due to lack of proper curing or other similar issues, the material of the shell layers will tend to be more prone to failure and thus pieces of the shell layers can break off and become depositing throughout the liquid metal. In certain extreme cases, this can result in liquid metal flowing out of the mold and into an unintended location.

Accordingly, a need exists for a casing of a gas turbine engine that can be easily cast as compared to conventional split casings.

Therefore, as will be described below, a split casing for a compressor of a gas turbine engine, such as the gas turbine engine 20 of FIG. 1, is provided. The split casing has relatively high-radius bends and a filled-in pocket that was otherwise prone to catching shell slurry. The fill-in pocket no longer catches shell slurry, which is more able to create an even coating. Additionally, by increasing the radii of the bends, a flow of the shell slurry over the corresponding wax pattern is improved and again provides for the creation of a more even coating which is then stronger during the pouring of liquid metal for casting. In addition, since the liquid metal will not be flowing around as tight of a bend during the casting process, local shell layers will tend to experience reduced stress.

Figure 2:
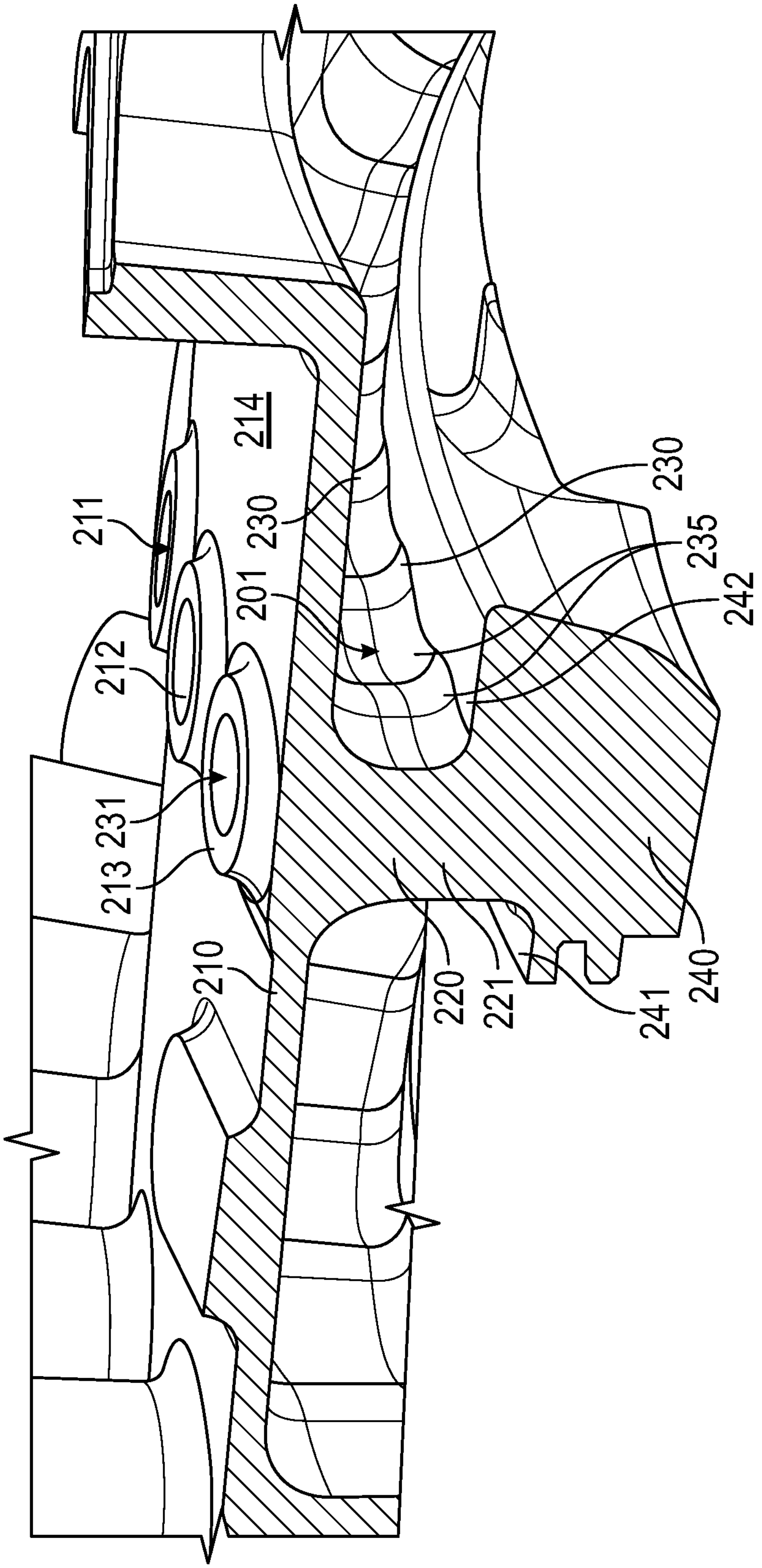
FIG. 2 is a perspective view of a portion of a compressor casing in accordance with embodiments.
Figure 3:
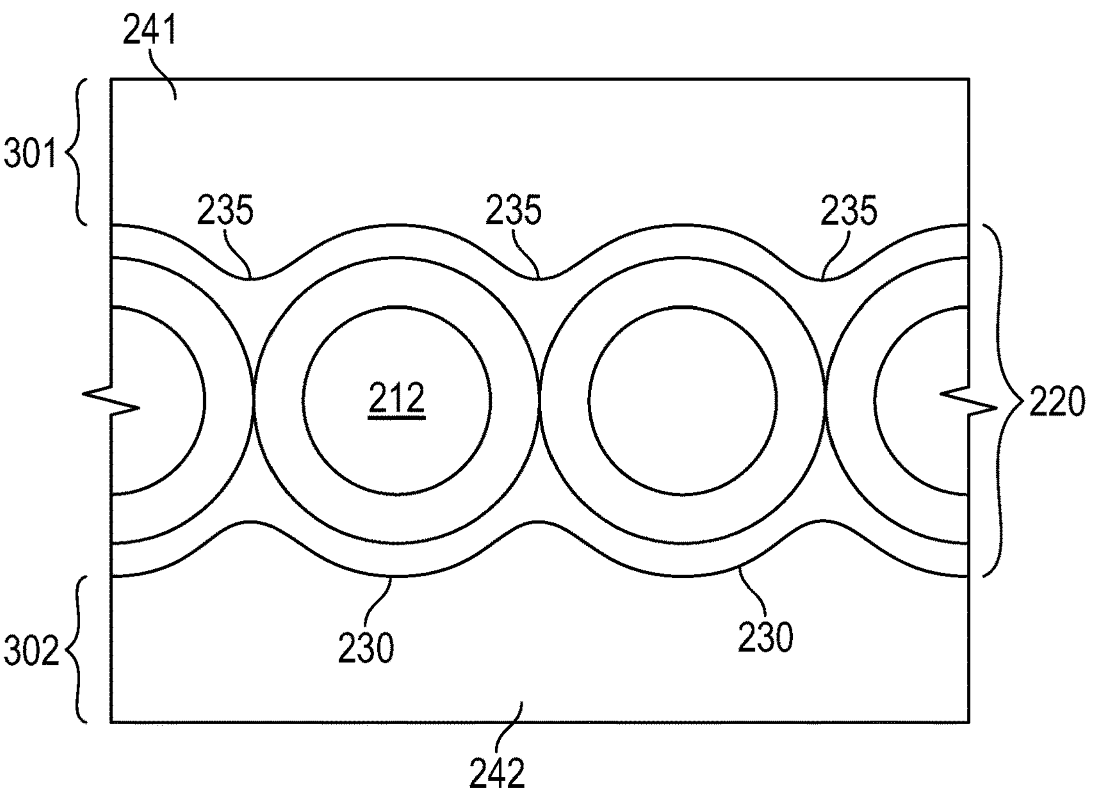
FIG. 3 is a radially inward view of a portion of a compressor casing in accordance with embodiments.
Figure 4:
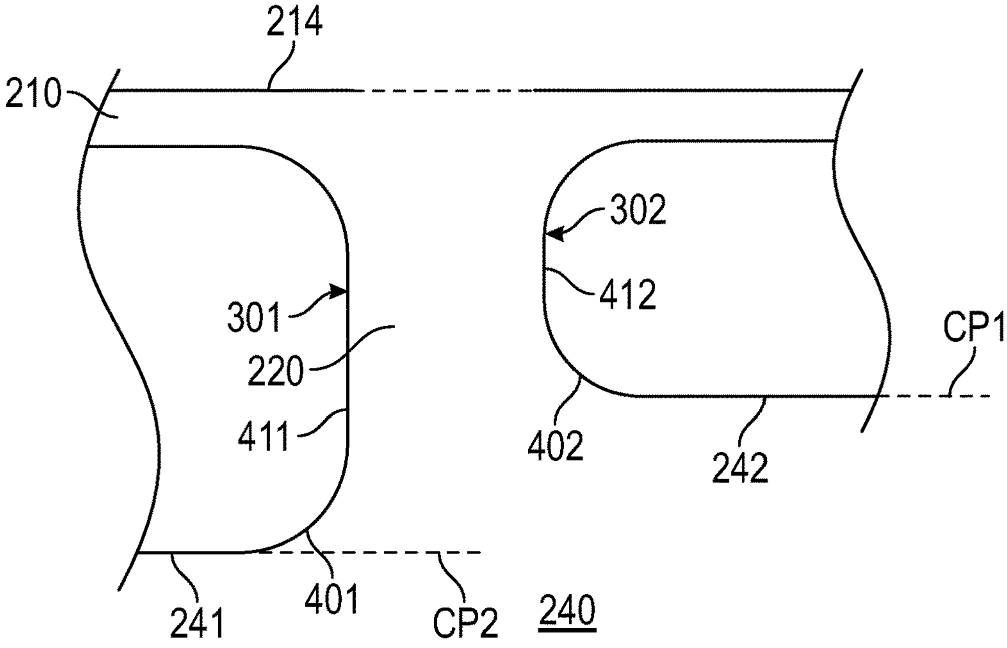
FIG. 4 is a side view of a portion of a compressor casing in accordance with embodiments.

With reference to FIGS. 2, 3 and 4, a compressor casing 201 is provided for use in the compressor section 24 of the gas turbine engine 20 of FIG. 1. The compressor casing 201 includes a circumferential outer wall 210, which is formed to define a circumferential array 211 of openings 212 for receiving additional parts, a circumferential rail 220 extending radially inwardly from the outer wall 210 and including scallop features 230 and smooth and continuous transitions 235 between neighboring scallop features 230 and a circumferential inner wall 240. The outer wall 210 includes bosses 213 at each of the openings 212 that protrude radially outwardly from an outer surface 214 of the outer wall 210. Each of the scallop features 230 is formed to encompass a single pathway 231 and each single pathway 231 of each scallop feature 230. The inner wall 240 is connected with a radially inboard end 221 of the rail 220. The inner wall 240 includes a first platform surface 241 and a second platform surface 242. The first platform surface 241 is provided at a first side 301 (see FIG. 3) of the rail 220 and includes first fillets 401 (see FIG. 4) respectively interfacing with first sides 411 of the scallop features 230. The second platform surface 242 is disposed radially outboard of the first platform surface 241 (see FIG. 4) at a second side 302 (see FIG. 3) of the rail 220 opposite the first side 301 and includes second fillets 402 (see FIG. 4) respectively interfacing with second sides 412 of the scallop features 230.

It is to be understood that while FIGS. 2, 3 and 4 and the accompanying text refer to both the rail 220 including smooth and continuous transitions 235 between neighboring scallop features 230 and to the second platform surface 242 being disposed radially outboard of the first platform surface 241, this is done for purposes of clarity and brevity and should not be interpreted in any way to otherwise limit the scope of this description or the following claims. Moreover, it is to be further understood that it is not necessary that these features be provided together and that embodiments exist in which the features are separate from one another. For example, in some cases, the rail 220 can include the smooth and continuous transitions 235 between neighboring scallop features 230 without the second platform surface 242 being disposed radially outboard of the first platform surface 241. As another example, in some cases, the rail 220 may not include the smooth and continuous transitions 235 between neighboring scallop features 230 whereas the second platform surface 242 is disposed radially outboard of the first platform surface 241. The following description will continue to relate to both features as provided above.

With continued reference to FIGS. 2 and 3, the smooth and continuous transitions 235 between neighboring scallop features 230 are characterized as having a smooth and repeating curvature around each of the scallop features 230 and between each of the neighboring scallop features 230. As such, it is apparent that the rail 220 can be configured with an absence of a sharp edge between neighboring scallop features 230. The smooth and continuous transitions 235 and the absence of the sharp edge between neighboring scallop features 230 allows for a smooth flow of slurry during casting avoids the potential for weak slurry layers and/or later breakage of cured slurry into molten metallic material. This improves the castability of the compressor casing 201.

With continued reference to FIGS. 2 and 4, radially outboard-most portions of the second fillets 402 extend radially outwardly beyond an outward radial extent of radially outboard-most portions of the first fillets 401. In addition, a circumferential plane CP1 of the second platform surface 242 is radially outboard of a corresponding circumferential plane CP2 of the first platform surface 241 with the second platform surface 242 being a radially outermost surface of the inner wall 240 aft of aft-most portions of the second fillets 402. As such, the inner wall 240 can be characterized as lacking a pocket or an aft edge rail that would otherwise tend to inhibit the flow of slurry or cause undesirable pooling of the slurry. This improves the castability of the compressor casing at the cost of some additional weight (i.e., around 11*b* total), which is effectively negligible especially in view of the improved castability.

Figure 5:
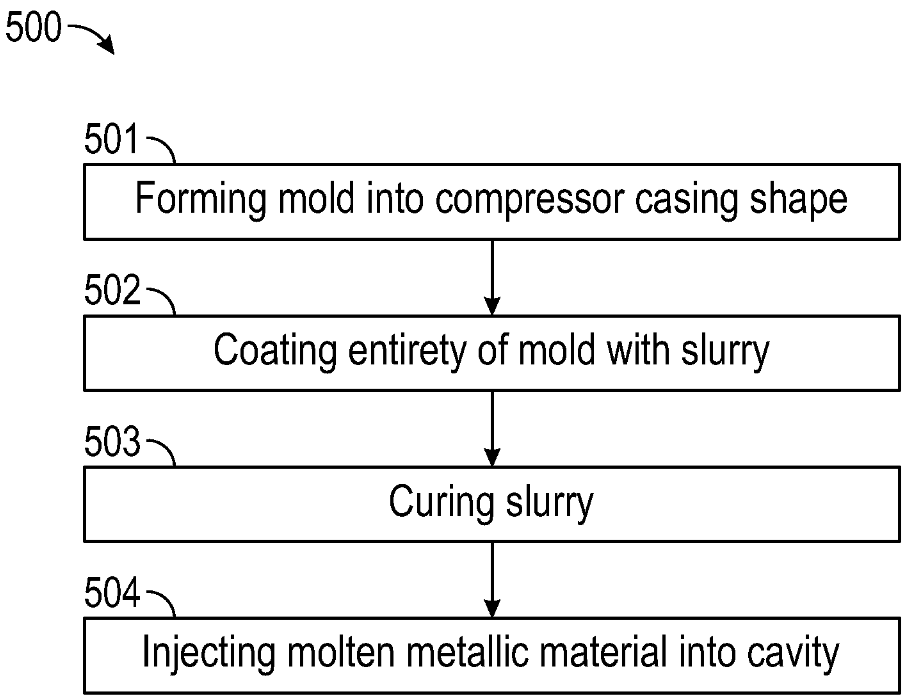
FIG. 5 is a flow diagram illustrating a casting method in accordance with embodiments.

With reference to FIG. 5, a casting method 500 is provided and includes forming a mold, such as a lost wax mold, into a compressor casing shape as generally described above (block 501), coating an entirety of the mold with slurry (block 502), curing the slurry to form a cavity (block 503) and injecting molten metallic material into the cavity (block 504).

Benefits of the features described herein are the provision of a split casing of a compressor that exhibits improved castability and reduced defects. While prior case designs often prioritized weight reductions over castability, the split casing described herein incorporates changes for the benefit of castability and producibility at a minimal cost of only slightly increased weight.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor casing, comprising:

an outer wall;

a rail extending inwardly from the outer wall and comprising scallop features encompassing pathways and smooth and continuous transitions between neighboring scallop features, the smooth and continuous transitions being characterized as having a smooth and repeating curvature around each of the scallop features and between each of the neighboring scallop features; and an inner wall connected with an inboard end of the rail and comprising:

a first platform surface at a first side of the rail and comprising first fillets interfacing with first sides of the scallop features; and a second platform surface outboard of the first platform surface at a second side of the rail opposite the first side and comprising second fillets interfacing with second sides of the scallop features.

2. The compressor casing according to claim 1, wherein the outer and inner walls and the rail are circumferential features.

3. The compressor casing according to claim 1, further comprising bosses that protrude radially outwardly from an outer surface of the outer wall.

4. The compressor casing according to claim 1, wherein each scallop feature encompasses a single pathway.

5. The compressor casing according to claim 1, wherein the rail is configured with an absence of a sharp edge between neighboring scallop features.

6. The compressor casing according to claim 1, wherein the second fillets extend radially outwardly beyond an outward radial extent of the first fillets.

7. The compressor casing according to claim 1, wherein a circumferential plane of the second platform surface is outboard of a corresponding circumferential plane of the first platform surface.

8. The compressor casing according to claim 1, wherein the second platform surface is a radially outermost surface of the inner wall aft of the second fillets.

9. A compressor casing, comprising:

an outer wall;

a rail extending inwardly from the outer wall and comprising scallop features encompassing pathways with smooth and continuous transitions between neighboring scallop features, the smooth and continuous transitions being characterized as having a smooth and repeating curvature around each of the scallop features and between each of the neighboring scallop features; and an inner wall connected with an inboard end of the rail and comprising platform surfaces with fillets interfacing with the scallop features.

10. The compressor casing according to claim 9, wherein the outer and inner walls and the rail are circumferential features.

11. The compressor casing according to claim 9, further comprising bosses that protrude radially outwardly from an outer surface of the outer wall.

12. The compressor casing according to claim 9, wherein each scallop feature encompasses a single pathway.

13. The compressor casing according to claim 9, wherein the rail is configured with an absence of a sharp edge between the neighboring scallop features.

14. The compressor casing according to claim 9, wherein the inner wall comprises:

a first platform surface at a first side of the rail and comprising first fillets interfacing with first sides of the scallop features; and a second platform surface at a second side of the rail opposite the first side and comprising second fillets interfacing with second sides of the scallop features.

15. The compressor casing according to claim 14, wherein the second fillets extend radially outwardly beyond an outward radial extent of the first fillets.

16. The compressor casing according to claim 14, wherein a circumferential plane of the second platform surface is outboard of a corresponding circumferential plane of the first platform surface.

17. The compressor casing according to claim 14, wherein the second platform surface is a radially outermost surface of the inner wall aft of the second fillets.

18. A casting method, comprising:

forming a mold into a compressor casing shape comprising:

an outer wall;

a rail extending inwardly from the outer wall and comprising scallop features encompassing pathways with smooth and continuous transitions between neighboring scallop features; and an inner wall connected with an inboard end of the rail and comprising:

a first platform surface at a first side of the rail and comprising first fillets interfacing with first sides of the scallop features; and a second platform surface outboard of the first platform surface at a second side of the rail opposite the first side and comprising second fillets interfacing with second sides of the scallop features, the method further comprising coating an entirety of the mold with slurry, curing the slurry to form a cavity and injecting molten metallic material into the cavity.

19. The casting method according to claim 18, wherein the mold is a lost wax mold.

* * * * *